US008429696B2

(12) United States Patent
Tecot et al.

(10) Patent No.: US 8,429,696 B2
(45) Date of Patent: Apr. 23, 2013

(54) MULTIMEDIA PRESENTATION RESUMPTION WITHIN AN ENVIRONMENT OF MULTIPLE PRESENTATION SYSTEMS

(75) Inventors: Edward M. Tecot, Sunnyvale, CA (US); Shannon C. Hegg, Mountain View, CA (US); Martine Habib, Woodside, CA (US)

(73) Assignee: Microsoft Corporation, Redmond, WA (US)

( * ) Notice: Subject to any disclaimer, the term of this patent is extended or adjusted under 35 U.S.C. 154(b) by 1060 days.

(21) Appl. No.: 10/698,349

(22) Filed: Oct. 31, 2003

(65) Prior Publication Data

US 2005/0097623 A1 May 5, 2005

(51) Int. Cl.
*H04N 7/18* (2006.01)
*H04N 7/173* (2011.01)
*H04N 7/16* (2011.01)
*G06F 3/00* (2006.01)

(52) U.S. Cl.
USPC .................. 725/80; 725/37; 725/92; 725/146

(58) Field of Classification Search .................. 725/146
See application file for complete search history.

(56) References Cited

U.S. PATENT DOCUMENTS

| 5,675,390 | A | 10/1997 | Schindler et al. |
| 5,805,235 | A | 9/1998 | Bedard |
| 5,884,056 | A | 3/1999 | Steele |
| 6,064,380 | A * | 5/2000 | Swenson et al. ............... 715/273 |
| 6,166,735 | A | 12/2000 | Dom et al. |
| 6,320,591 | B1 | 11/2001 | Griencewic |
| 6,460,038 | B1 | 10/2002 | Khan et al. |
| 6,611,654 | B1 * | 8/2003 | Shteyn ............................ 386/83 |
| 6,642,939 | B1 * | 11/2003 | Vallone et al. ................ 715/721 |
| 6,647,548 | B1 | 11/2003 | Lu et al. |
| 7,103,906 | B1 | 9/2006 | Katz et al. |
| 7,143,353 | B2 * | 11/2006 | McGee et al. ................ 715/723 |
| 7,289,812 | B1 * | 10/2007 | Roberts et al. ............. 455/456.1 |
| 7,346,917 | B2 | 3/2008 | Gatto et al. |
| 7,451,467 | B2 | 11/2008 | Carver et al. |
| 7,492,278 | B2 | 2/2009 | Zigmond et al. |

(Continued)

FOREIGN PATENT DOCUMENTS

| CN | 1363184 | 7/2002 |
| WO | WO0004726 A2 | 1/2000 |

(Continued)

OTHER PUBLICATIONS

Bell, et al., "A Call for the Home Media Network", Communication of the ACM, vol.45, No. 7, Jul. 2002, pp. 71-75.

(Continued)

*Primary Examiner* — Brian Pendleton
*Assistant Examiner* — Jean D Saint Cyr
(74) *Attorney, Agent, or Firm* — Lee & Hayes, PLLC

(57) ABSTRACT

With at least one implementation described herein, one or more viewers are able to watch the same source multimedia content at multiple locations within an environment (e.g., a household). With at least one implementation described herein, a viewer is able to resume watching such content at a new location (or "locus") from the point that she bookmarked the content at an original location. This abstract itself is not intended to limit the scope of this patent. The scope of the present invention is pointed out in the appending claims.

50 Claims, 11 Drawing Sheets

U.S. PATENT DOCUMENTS

| | | |
|---|---|---|
| 7,836,473 B2 | 11/2010 | Tecot et al. |
| 2002/0012526 A1 | 1/2002 | Sai et al. |
| 2002/0059621 A1* | 5/2002 | Thomas et al. ............... 725/87 |
| 2002/0174431 A1* | 11/2002 | Bowman et al. ............... 725/47 |
| 2003/0016951 A1 | 1/2003 | Jakel et al. |
| 2003/0126599 A1* | 7/2003 | Novak et al. ................... 725/32 |
| 2003/0139980 A1 | 7/2003 | Hamilton |
| 2003/0206719 A1* | 11/2003 | Bumgardner et al. ......... 386/83 |
| 2004/0001107 A1 | 1/2004 | Russon |
| 2005/0022132 A1 | 1/2005 | Herzberg et al. |
| 2005/0028208 A1* | 2/2005 | Ellis et al. ..................... 725/58 |
| 2005/0166258 A1* | 7/2005 | Vasilevsky et al. ............ 725/138 |
| 2005/0246746 A1 | 11/2005 | Yui et al. |
| 2006/0181390 A1* | 8/2006 | Zigmond et al. ............. 340/5.22 |

FOREIGN PATENT DOCUMENTS

| | | |
|---|---|---|
| WO | WO0058967 A1 | 10/2000 |
| WO | WO03061283 A1 | 7/2003 |
| WO | WO03067594 A1 | 8/2003 |

OTHER PUBLICATIONS

Office Action for U.S. Appl. No. 12/133,549, mailed on May 5, 2011, 23 pages.

Office Action for U.S. Appl. No. 12/098,971, mailed on May 16, 2011, 16 pages.

The European Office Action mailed Mar. 8, 2012 for European patent application No. 04023848.7, a counterpart foreign application of US patent No. 7,836,473, 5 pages.

The European Office Action mailed Aug. 9, 2012 for European patent application No. 04023848.7, a counterpart foreign application of US patent No. 7,836,473, 4 pages.

* cited by examiner

MULTIMEDIA PRESENTATION RESUMPTION WITHIN AN ENVIRONMENT OF MULTIPLE PRESENTATION SYSTEMS

TECHNICAL FIELD

This invention generally relates to a multimedia technology.

BACKGROUND

Digital cable and satellite have begun to change the nature of home entertainment by vastly expanding the choices available to consumers. Digital Video Recorders and Video-On-Demand have made "appointment TV" unnecessary by putting the consumer in charge of when they wish to view. However, the problem of where to watch has been mostly unanswered by these new devices.

In a typical home, a consumer is watching audio/visual (herein "multimedia") content from one of several typical sources. Examples of such typical sources include:

- Video cassette recorder/player (VCR) and its video tapes;
- DVD player/recorder and its DVD disks;
- Digital video recorder (DVR) and its secondary storage device (such as a hard disk). These are sometimes called personal video recorders (PVRs); and
- Live television ("Live TV") broadcast via cable, satellite dish, or antennae. This may include video-on-demand (VOD) or pay-per-view (PPV).

Of course, these are just examples of typical sources and other such sources may exist.

Base Scenario

The following describes the base scenario considered herein:

- An environment has multimedia presentation systems at multiple different loci in the environment. For example, a home may have multiple television sets and each one is in a different room. One may be in the living room, one in each of 3 bedrooms, and another in the game room.
- Multimedia content is being viewed at one of the presentation systems at one of the loci. For example, a person is watching a movie in the living room.
- The viewer moves to another locus in the environment, but wishes to continuing watching the same multimedia content that she was viewing at the previous locus. For example, a person goes to the bedroom, but wants to continue to watch the same movie that they were watching in the living room.
- More particularly, the viewer may want to continue watching the same multimedia content at the new locus exactly at the point where she ceased viewing the content at the previous locus. For example, a person may go to the kitchen, but wants to continue to watch the same movie exactly at the point where she paused it in the living room.

Conventional Approaches

With all of the conventional approaches, each of the presentation systems (e.g., televisions) at each locus (e.g., rooms) has its own source of the multimedia content. Examples of such sources include the VCR, DVD player, DVR, and Live TV.

None of the conventional approaches allow a viewer to pick-up a presentation of multimedia content in a new location, at the point where the viewer stopped viewing it in the original location.

The following describes how to accomplish this base scenario using conventional approaches.

VCR: The viewer must stop the tape at the original locus and take it with her to the new locus. The new locus must have its own VCR to play the tape. The viewer may put the tape in the VCR at the new locus and it will start playing where the viewer stopped it in the original locus.

DVD: The viewer must stop the DVD player at the original locus and take the DVD disk with her to the new locus. The new locus must have its own DVD player. When the viewer loads the DVD into the DVD player of the new location, the typical DVD players will start playing the DVD at the very beginning. The user will have to manually jump ahead to a point on the DVD disk that is close to where she stopped viewing at the original locus.

DVR: There is no conventional technology that allows the user to accomplish this base scenario. Since the source of the multimedia content remains in the DVR at the original locus, the viewer is not able to pick exactly where she left off viewing in the original locus. If the DVR has a removable media, then this approach is more like the VCR or DVD approach.

Live TV: The viewer is not able to stop or pause live television broadcast. The viewer may watch the same broadcast at another locus, but the viewer will not be able to continue from exactly where she paused the broadcast at the original locus. While a DVR is capable of "pausing" live TV, there is no conventional technology that allows for the user to resume watching such paused live TV at another locus.

Alternative Scenario

In addition to the base scenario provided above, assume that another viewer wishes to continue to watch the multimedia content at the original locus (or at another locus) when the first viewer leaves to go view the content at still another locus.

For example, assume that there are two people watching a recorded movie. One person "pauses" the movie and leaves the room to go to another room in the house. However, the remaining person continues to watch the movie. The person who left the room wishes to resume watching the movie in a new room. Although another person continues to watch the movie in the original room, the person who left the room wishes to resume watching exactly where she "paused" it.

None of the current approaches addresses this alternative scenario.

SUMMARY

With at least one implementation described herein, one or more viewers are able to watch the same source multimedia content at multiple locations within an environment (e.g., a household). With at least one implementation described herein, a viewer is able to continue watching such content at a new location (or "locus") from the point that she bookmarked the content at an original location.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

Figure 1:
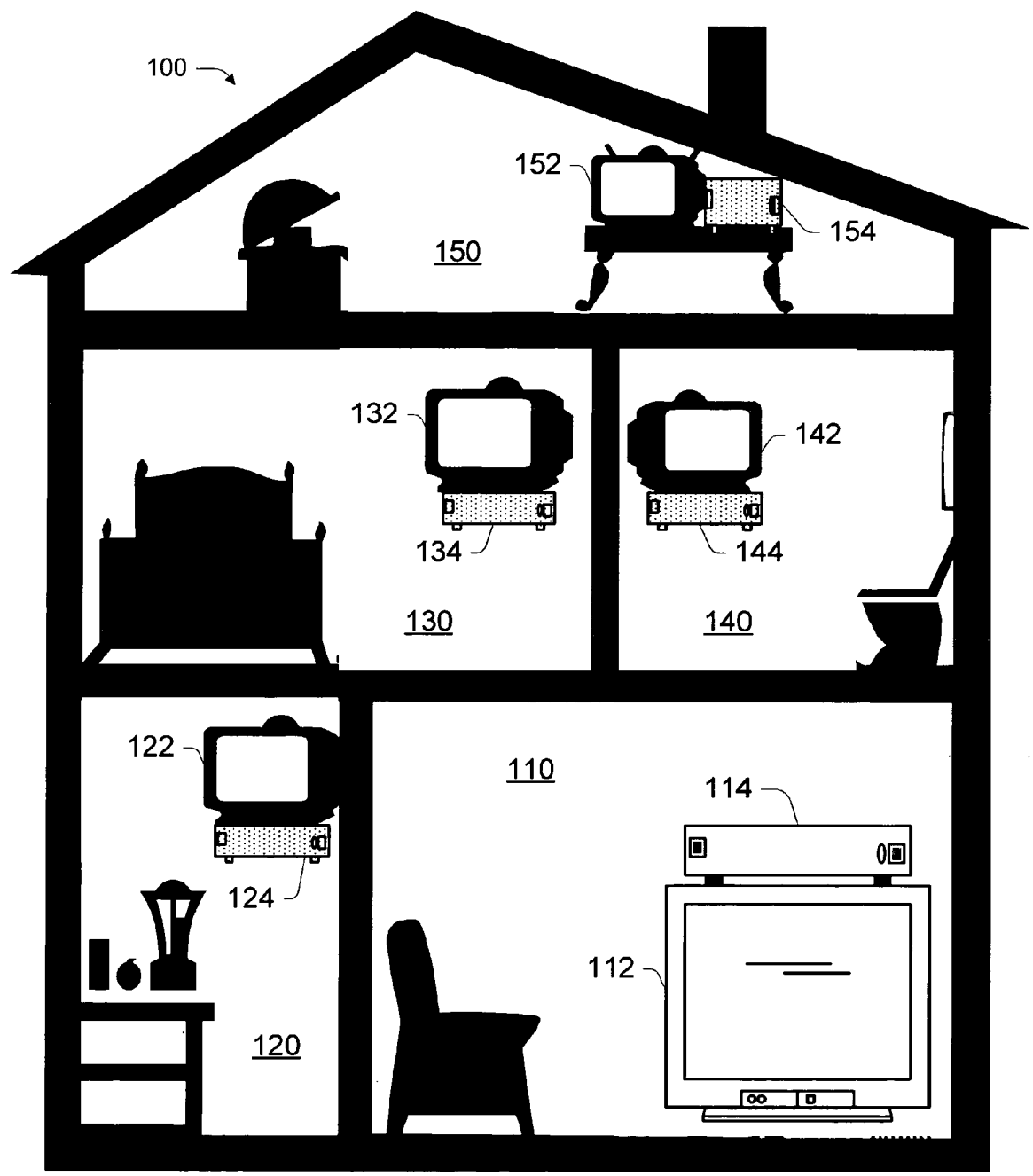
FIG. 1 is a general environmental diagram intended to illustrate a typical environment suitable for at least one embodiment described herein.

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of the present invention and, thereby, to better explain the present invention. Furthermore, for ease of understanding, certain method steps are delineated as separate steps; however, these separately delineated steps should not be construed as necessarily order dependent in their performance.

The following description sets forth one or more exemplary implementations of multimedia presentation resumption within an environment of multiple presentation systems that incorporate elements recited in the appended claims. These implementations are described with specificity in order to meet statutory written description, enabling, and best-mode requirements. However, the description itself is not intended to limit the scope of this patent.

These exemplary implementations, described herein, are examples. These exemplary implementations do not limit the scope of the claimed present invention; rather, the present invention might also be embodied and implemented in other ways, in conjunction with other present or future technologies.

An example embodiment of multimedia presentation resumption within an environment of multiple presentation systems may be referred to as an "exemplary resumption architecture."

Herein, "presenting" includes communicating the multimedia content to a display and/or audio device. Herein, "broadcast media" refers to a multimedia transmission (such as a television or radio broadcast) being received via at least one broadcast tuner.

Herein, "multi-TV" refers to the use of multiple multimedia presentation systems (such as television equipment). This term presumes that the multiple presentation systems are dispersed across several different locations (or "loci") in an environment. For example, a household may have multiple rooms, each with television equipment.

Herein, "bookmark & resume" of broadcast media effectively produces a time-shift of the broadcast media. It may appear to the viewer that she is "pausing" the broadcast media when she presses the "pause" button (or some other designated button, like a "bookmark" button) for her DVR. However, in reality, the broadcast media broadcast continues, but the DVR records it for later presentation. When the viewer later un-bookmarks (or "resumes") the presentation of the broadcast media, the DVR plays the recorded content from the point that it was "bookmarked."

When the user "bookmarks" broadcast media, she does not decide a priori to record the multimedia content being presented. Rather, such recording of the content and later presentation of that content is performed automatically by the DVR. It is typical for a DVR to automatically and continuously record multimedia content. And it may do so without specific manual directions (e.g., pressing a "pause" button) from a user.

Herein, "multimedia content" includes digital video streams as well as audio, music, DVDs, a slide show of digital images, and interactive content (e.g., games, the Internet, interactive TV). Moreover, digital multimedia content also includes content that has been converted from the analog domain, especially audio, video, and television.

Introduction

Unlike the conventional approaches, the exemplary resumption architecture addresses and solves the base scenario and alternative scenario that are described in the BACKGROUND section above.

With the exemplary resumption architecture, one or more viewers are able to watch the same source multimedia content at multiple locations (or "loci") within an environment (e.g., a household). More particularly, with the exemplary resumption architecture, the viewer is able to resume watching such content at a new location (or "locus") from the point that she bookmarked the content at an original location. More particularly still, with the exemplary resumption architecture, the viewer can do the above while another viewer continues to watch the content at the original location or at yet another location in the environment.

With the exemplary resumption architecture, all multimedia content on a central hub is available to all presentation systems coupled to that hub Therefore, a viewer may effectively "move" the content that she is watching from one location in the environment to another and continue to watch without missing any of the content.

Multi-TV Environment

FIG. 1 shows an example of a typical environment 100 in which the exemplary resumption architecture may be implemented. The typical environment 100 shown here includes multiple presentation systems coupled together in a household. Of course, other implementations may be at other similar settings, such as apartment buildings, office buildings, school buildings, factories, etc. Implementations are not limited to an area defined by a structure, but may extend a neighborhood, community, town, city, state, nation, globe, etc.

As shown in FIG. 1, the household includes a living room 110, a kitchen 120, a bedroom 130, a bathroom 140, and a game room 150. Each room has its own presentation system. Those systems include:

- television 112 and multimedia hub 114 in the living room 110;
- television 122 and multimedia node 124 in the kitchen 120;
- television 132 and multimedia node 134 in the bedroom 130;
- television 142 and multimedia node 144 in the bathroom 140; and
- television 152 and multimedia node 154 in the game room 150.

Although it is not shown in FIG. 1, these presentation systems are communicatively coupled to each other. In other words, they are networked together. In this way, the hub may communicate with the nodes.

Each of these presentation systems includes a multimedia presentation device (e.g., a television) and a multimedia hub or node. For example, the system in the bedroom 130 includes the television 132 and its multimedia node 134. This node (or hub) is sometimes called a set-top box.

The set-top box is coupled to its television for presentation of the multimedia content (e.g., audio data and video data) received by the presentation system, as well as a graphical user interface (GUI). A particular set-top box may be coupled to any number of televisions and/or similar devices that may be implemented to display or otherwise render content.

The hub 114 may be implemented in any number of embodiments, including as a set-top box, a satellite receiver, a TV recorder with a hard disk, a game console, an information appliance, a DVD player, a DVR, a personal computer, a home media center, and so forth. The hub will have at least some form of DVR components and functionality. In particular, it will have a storage device capable of storing recorded multimedia content or "bookmarking" broadcast media.

The nodes may also be implemented in any number of embodiments, but they do not need as much functionality as the hub 114 since the hub services the nodes. Therefore, they need, at least, to be able to communicate with the hub and to receive multimedia content from the hub.

In the exemplary environment 100 shown in FIG. 1, the set-top boxes (such as hub 114 and node 134) are shown as standalone units that connect to their televisions. Alternatively, the various components and functionality of the set-top box are incorporated into the television, rather than using two separate devices.

Figure 2:
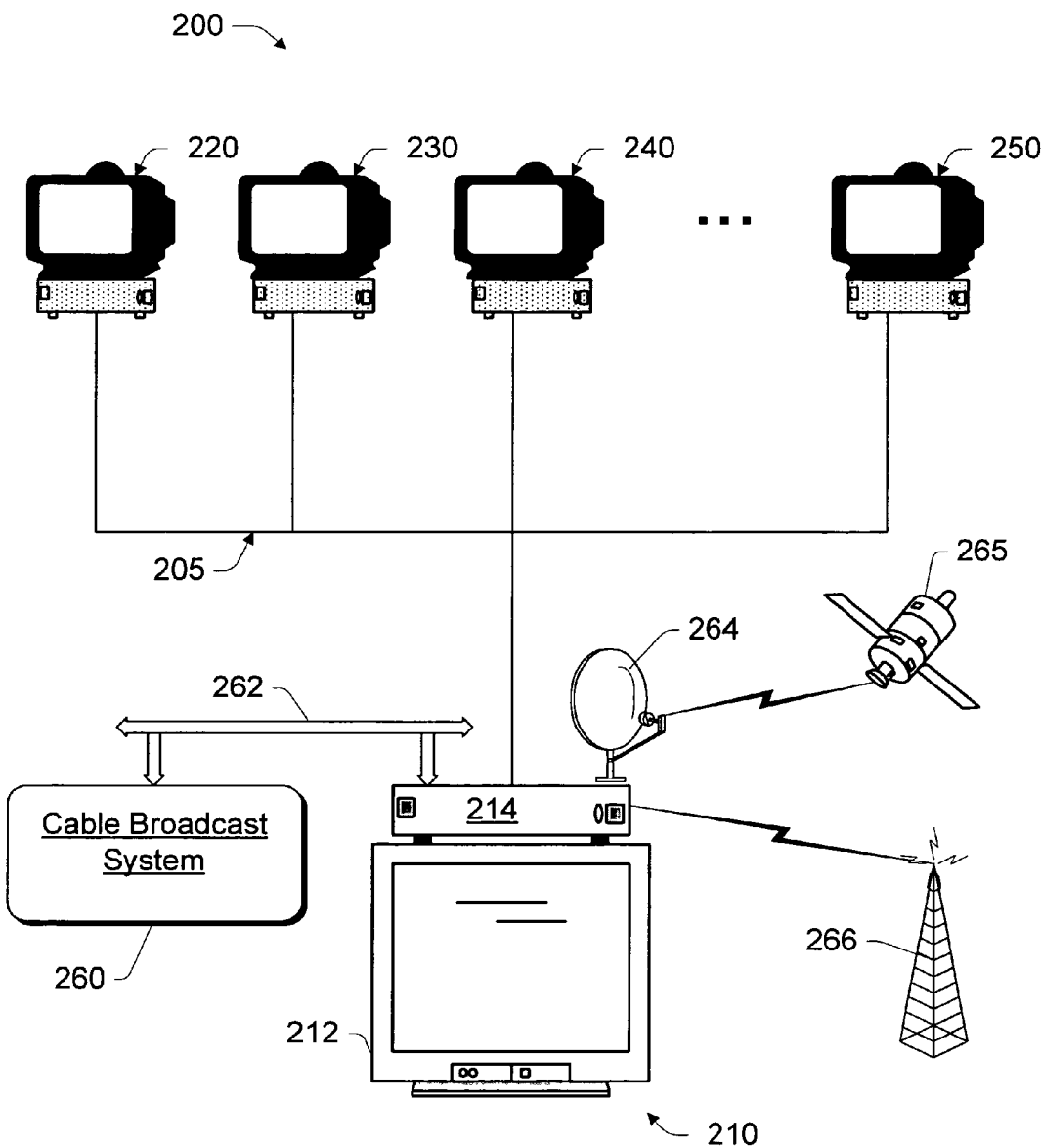
FIG. 2 is a general schematic diagram intended to illustrate a typical environment suitable for at least one embodiment described herein.

FIG. 2 illustrates another exemplary environment 200 in which the techniques, systems, and other aspects described herein may be implemented (partially or wholly). Exemplary environment 200 is a television entertainment architecture that facilitates distribution of multimedia content. At least a portion of this environment corresponds to the exemplary environment 100 shown in FIG. 1.

FIG. 2 shows a centralized multimedia presentation system 210 coupled to one or more presentation systems 220, 230, 240, and 250 over a communications network 205. The centralized multimedia presentation system 210 includes a hub 214 with its television 212.

The communications network 205 may include any communicative media as long as it is capable of satisfactorily transmitting multimedia content from the hub to a node. Examples of such communicative media include (for example): a cable television network, RF, microwave, satellite, and/or data network, such as the Internet, and may also include wired or wireless media. As long as multimedia content transmission is satisfactory, the communications network 205 may be any type of network, using any type of network topology and any network communication protocol, and may be represented or otherwise implemented as a combination of two or more networks.

The centralized multimedia presentation system 210 has one or more tuners for receiving incoming multimedia content from one or more sources of such content. Indeed, each source may have one or more tuners. Such tuners may include in-band tuners that tune to various frequencies or channels to receive television signals. These tuners may be digital tuners, analog tuners, or any combination of analog and digital components used to get digital data into the centralized multimedia presentation system 210.

Alternatively, the centralized multimedia presentation system 210 of the exemplary resumption architecture may not have any tuners. Instead of tuning and demodulating an incoming multimedia signal, the system may receive streamed content via another mechanism that does not employ tuners. For example, it may receive the streamed content via a packet protocol.

The centralized multimedia presentation system 210 has enough tuners to service the needs of the exemplary resumption architecture. If there are an insufficient number of tuners to meet the needs, then the exemplary resumption architecture will have a strategy for allocating the tuning resources.

The sources of multimedia data from which the tuners may receive content may include (for example):

- a cable broadcast system 260 over a cable broadcast network 262;
- a satellite broadcast system which is received by a satellite dish 264 from an orbiting satellite 265; and
- a live television broadcast from a local broadcast antenna 266.

Furthermore, the centralized multimedia presentation system 210 may store multimedia content on its internal storage system (as a DVR does) or from other storage media (such as a DVD). Alternatively, multimedia content may be at another communicatively coupled location on the network rather than on the hub. For example, a location may have a centralized storage location for such content. Also, for example, a cable headend may maintain storage for many subscribers. Moreover, the storage may be maintained via a federation of hubs and nodes where each shares their own available storage.

The cable broadcast system 260 may provide broadcast media having multimedia content, such as movies, television programs, live feeds, video-on-demand, pay-per-view, commercials, music, and similar audio and/or video content. The cable broadcast network 262 may include a cable television network, RF, microwave, satellite, and/or data network, such as the Internet, and may also include wired or wireless media. Furthermore, it may be any type of network, using any type of network topology and any network communication protocol, and may be represented or otherwise implemented as a combination of two or more networks.

Bookmarks

When a bookmark command is received while a multimedia content is being presented, the centralized multimedia presentation system 210 of the exemplary resumption architecture stores a "bookmark" indicative of that point in the presentation.

Each bookmark will be associated with a particular multimedia content and will identify the location for which the bookmark was created within the presentation of the multimedia content. The bookmark may have many other properties associated with it as well. Examples of these other properties may include (but are not limited to):

identifying the particular multimedia content that is "bookmarked;"

identifying the physical or logical location where the multimedia content was "bookmarked (i.e., which device through which the bookmark was set);"

identifying a relative time within the multimedia content;

identifying the user who "bookmarked" the multimedia content; and absolute chronological time/date (i.e., this is the time at which the bookmark was set—not the relative time within the content, but the actual GMT time that the user requested the bookmark to be set).

For example, a bookmark for Program X may indicate that "John" bookmarked the presentation of Program X in the "living room" at a relative time of 1:05:35 into the presentation and did so on Tuesday, Sep. 23, 2003 at 8:43 pm.

Furthermore, when presented on GUI, the bookmarks have visible characteristics so that they are differentiated from each other. For example, bookmarks for "Jane" may be red to distinguish them from the blue bookmarks of "John." In another example, differing types of bookmarks may use different icons to distinguish them.

Operation of the Exemplary Resumption Architecture

With the exemplary resumption architecture, a user may bookmark any stored content on one presentation system and resume it on any other (within the network environment).

At an original location, the user "bookmarks" the multimedia content ("program") that she is watching. The presentation system at the original location creates and stores a bookmark. This original location may be called the "bookmark location" or "bookmark locus." Now that the presentation has been "bookmarked," the user may access it on a presentation system at another location in the networked environment.

The presentation system in the new location retrieves the bookmark and presents a GUI that asks if the user wants to resume playing the content that was bookmarked from the bookmark's location. If there are multiple bookmarks, multiple locations are presented. This new location may be called the "resume location" or "resume locus."

When a user (of any presentation system in the networked environment) queries for information about a particular multimedia content (herein, "program"), a resume option is provided if there is a bookmark stored for that program. If there is more than one bookmark for a particular program, then option to "resume from . . . " is provided so that the user may select which bookmark. If the user selects the "resume from . . . " option, an interface containing the list of locations is presented.

Broadcast Media

A system does not need tuners to present stored multimedia content. However, with broadcast media, the system must have at least one tuner to receive the broadcast. This broadcast media includes typical broadcast television, typical cable broadcasts, reception of video-on-demand (VOD), and reception of pay-per-view (PPV).

With broadcast media, the user can "bookmark" the broadcast media content at any point. The hub records the broadcast media content using a tuner. When the user moves to another location, the user may pick-up watching the broadcast media content at the point of the "bookmark." When the user "resumes," the hub provides the just recorded content for the "broadcast media" as it continues to record what it is receiving on the tuner.

The exemplary resumption architecture tracks the state of all live content being consumed by every system in the environment. This includes live content that is playing and live content that is "bookmarked."

Whenever the user requests information on a live program, the exemplary resumption architecture presents a GUI with information (such as start times and length of program) about the live program. Broadcast media programs appearing in an electronic program guide GUI may contain icons denoting that they contain one or more bookmarks. In other words, the icon indicates that the presentation of this broadcast media program was bookmarked somewhere at sometime. When the user selects this program, she is given the option to resume (from one or more bookmarks) or watch actual live broadcast.

If a user wishes to bookmark live content and resume in another location, the exemplary resumption architecture may use tuner swapping, where the state regarding the playback of content on the two devices is exchanged. Alternatively, it employs tuner sharing, by allowing multiple devices to play back the same shared content while keeping independent state.

If a user wishes to bookmark live content and resume in another location, there are at least two approaches available. The first is called tuner-swapping. With this, the state regarding the playback of content on the two systems (the original location and the new location where the content is resumed) is exchanged. The second is called tuner-sharing. With this, the exemplary resumption architecture allows for multiple devices to playback the same shared content while keeping independent state.

One way to accomplish tuner swapping is for the "source" location to give up its tuner to a "destination" location. Thus, the destination will have access to the media content "pause" buffer attached to the particular tuner, but the source will not.

As a practical example of this: Users A and B are watching time delayed broadcast media on channel 5 in the living room. If user A moves to the bedroom, user B has three choices: go with user A to the bedroom and continue watching the time delayed broadcast media, stay in the living room and watch another channel, or see channel 5 go live, thus missing the content in the pause buffer.

Instead of "tuner swapping," the tuner may be shared. The "source" and "destination" share the tuner and the "pause" buffer. Practical example: Same situation as above, however, user B can continue to watch the time delayed broadcast media in the living room.

With bookmarked broadcast media, the presentation system at the resume location reads from the same storage as the presentation system at the bookmark location and synchronizes its state at that time. No further synchronization is needed or desired. The users of systems at both locations (the original bookmark location and the new resume location) are free to watch the content as they see fit.

Again, the exemplary resumption architecture may employ either tuner "swapping" or "sharing." Alternatively, it may employ another functionally equivalent option.

Figure 3:
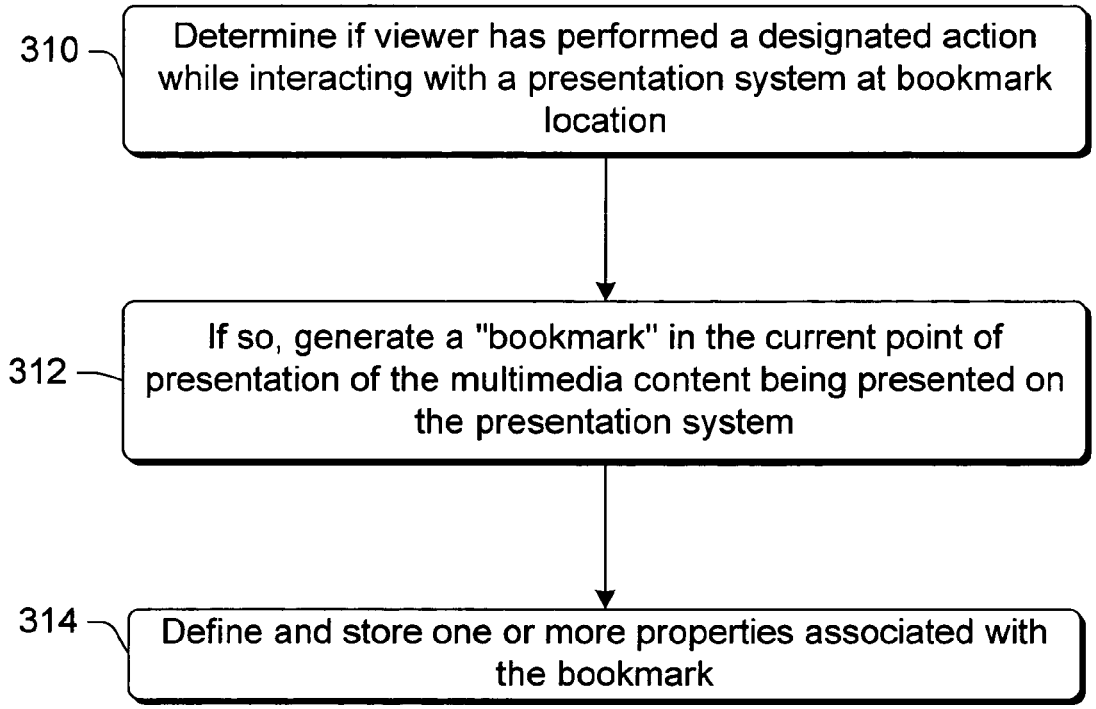
FIG. 3 is a flow diagram showing a methodological implementation described herein.

Methodological Implementations of the Exemplary Pull-Based Resumption Architecture FIG. 3 shows a methodological implementation of the exemplary resumption architecture. This methodological implementation may be performed in software, hardware, or a combination thereof.

This methodological implementation is focused on bookmarking multimedia content (stored or broadcast media) in response to a viewer's action (such as bookmarking a presentation). More particularly, it is focused on a pull-based model, where the system at the resume location provides a user interface for initiating the resumption of the presentation.

At 310 of FIG. 3, the exemplary resumption architecture determines if the viewer has performed one of the designated actions while interacting with a presentation system at the bookmark locus. If not, it just waits until such action occurs. If so, it proceeds to block 312.

Examples of designated actions that may trigger proceeding to block 312 include (but are not limited to) the following:
While watching a stored program,
the user chooses to watch a broadcast media channel;
the user goes to recorded shows list and starts watching another show;
the user goes to a VOD menu and selects to watch a VOD program; or
the user goes to a page without a TV control (e.g., the user has accessed a user interface which does not present the current video stream);
the user presses the "pause" key or a dedicated "bookmark" key (on a remote control, on the system, or via a GUI).
While watching a VOD program,
the user chooses to watch a broadcast media channel;
the user goes to recorded shows list and starts watching a recorded show;
the user goes to a VOD menu and selects to watch another VOD program; or
the user goes to a page without a TV control (e.g., the user has accessed a user interface which does not present the current video stream);
the user presses the "pause" key or a dedicated "bookmark" key (on a remote control, on the system, or via a GUI).
While watching a broadcast media program,
the user chooses to watch another broadcast media channel;
the user goes to recorded shows list and starts watching a recorded show;
the user goes to a VOD menu and selects to watch a VOD program; or
the user presses the "pause" key or a dedicated "bookmark" key (on a remote control, on the system, or via a GUI).

At 312, it generates a "bookmark" in the current point of presentation of the stored multimedia content being presented on the presentation system.

At 314, the exemplary resumption architecture defines one or more properties associated with the bookmark and stores the bookmark in association with the stored multimedia content. Examples of the types of properties are discussed above in the section titled, "Bookmarks."

Since this is the pull-based model, the hub simply waits for a system at a resume location to request the bookmarked program before actually streaming it to another system on the networked environment.

Although the program's presentation has been bookmarked (so that it can be resumed in another location), the program's presentation may continue at the original location as well. For example, two people are watching a broadcast media program. One person bookmarks the program and goes to resume watching it in another room in the household. However, the other person may remain in the room and continue to watch the program at the original location.

Figure 4:
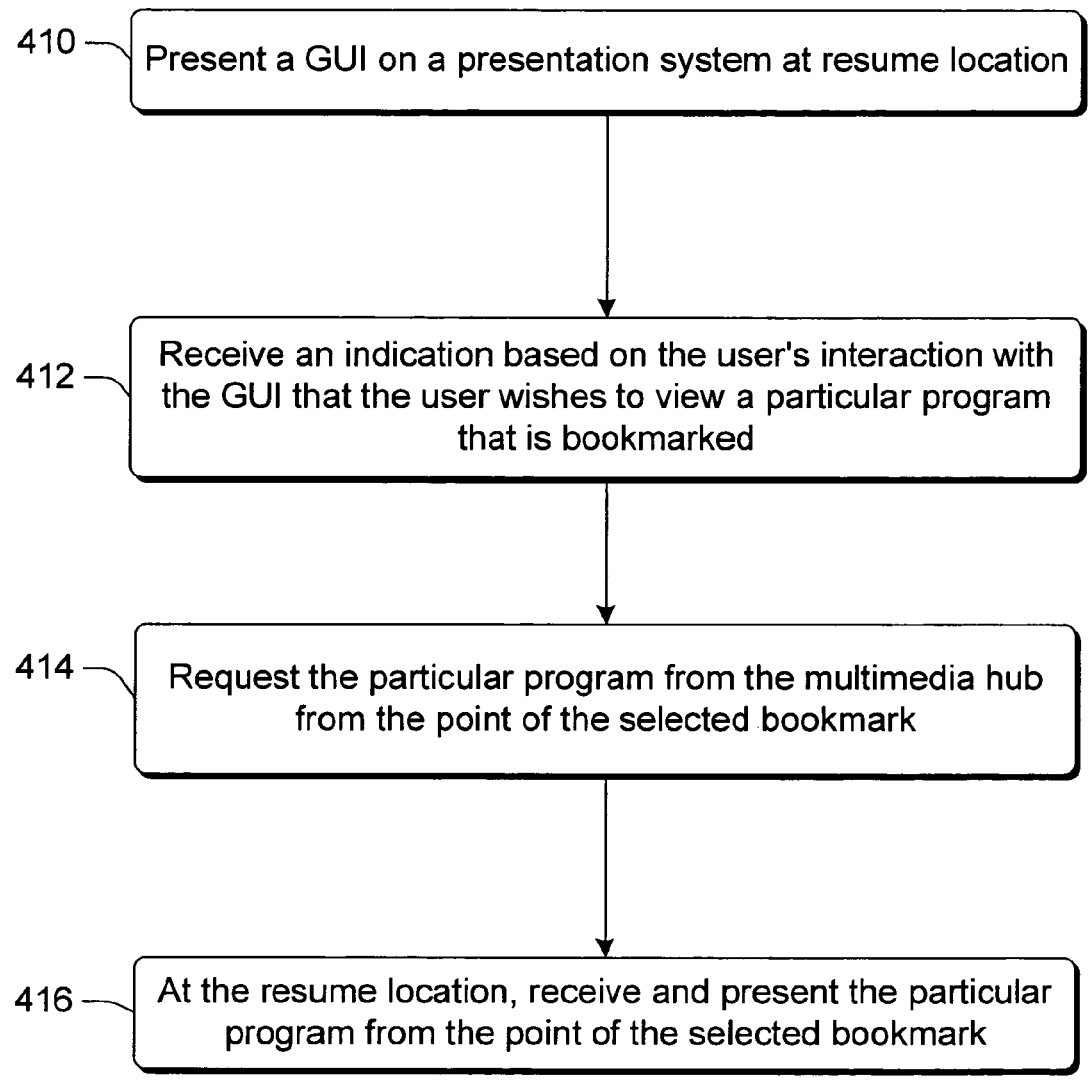
FIG. 4 is a flow diagram showing a methodological implementation described herein.

FIG. 4 shows a methodological implementation of the exemplary resumption architecture. This methodological implementation is focused on resuming a bookmarked presentation of multimedia content (stored or broadcast media) at another location. This methodological implementation may be performed in software, hardware, or a combination thereof.

At 410 of FIG. 4, a presentation system at the resume locus ("resume-locus system") presents a graphical user interface (GUI). Examples of such GUIs are shown in FIGS. 7-13 and discussed in the corresponding text below.

At 412, the resume-locus system receives an indication based on the user's interaction with the GUI that the user wishes to view a particular program that has been bookmarked.

At 414, the resume-locus system requests (from the multimedia hub) the particular program to start from the point of the selected bookmark.

At 416, the resume-locus system receives (from the hub) the particular program from the point of the selected bookmark. It presents the program from that point.

Since this is the pull-based model, the resume-locus system initiates the resumption of a bookmarked multimedia content rather than the bookmark-locus system.

Figure 5:
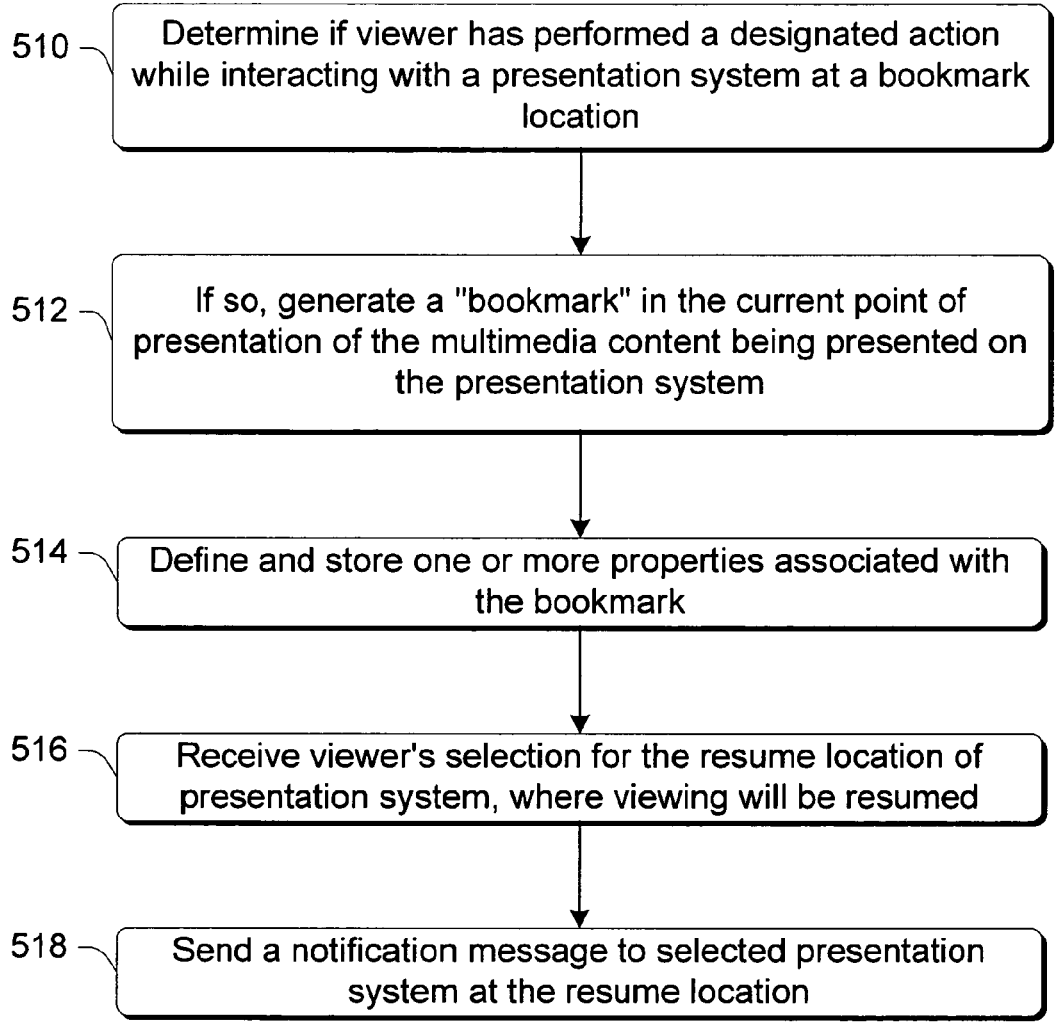
FIG. 5 is a flow diagram showing a methodological implementation described herein.

Methodological Implementations of the Exemplary Push-Based Resumption Architecture FIG. 5 shows a methodological implementation of the exemplary resumption architecture. This methodological implementation may be performed in software, hardware, or a combination thereof.

This methodological implementation is focused on bookmarking multimedia content (stored or broadcast media) in response to a viewer's action (such as bookmarking a presentation). More particularly, it is focused on a push-based model, wherein the hub streams (or "pushes") the bookmarked program to a selected system at the resume location.

With this push-based approach, the user is asked where to "move" the bookmarked program once the user has bookmarked it. It is very "discoverable" in the sense of ease-of-use. When the person arrives at the resume location, she only needs to indicate that she is ready and the bookmarked program continues at that new location.

At 510 of FIG. 5, the exemplary resumption architecture determines if the viewer has performed one of the designated actions while interacting with a presentation system at the bookmark locus. If not, it just waits until such action occurs. If so, it proceeds to block 512.

Examples of which designated actions may trigger proceeding to block 512 are listed above in the discussion of block 310 of FIG. 3.

At 512, the exemplary resumption architecture generates a "bookmark" in the current point of presentation of the stored multimedia content being presented on the presentation system.

At 514, the exemplary resumption architecture defines one or more properties associated with the bookmark and stores the bookmark in association with the stored multimedia content. Examples of the types of properties are discussed above in the section titled, "Bookmarks."

At 516, it receives the viewer's selection for the resume location, which is where the viewer plans to continue viewing the bookmarked presentation. This can be done in many ways. For example, a GUI may present several selected location options, and the viewer chooses one. Alternatively, the viewer may choose multiple locations or all locations.

At 518, the hub sends a notification (or some form of communication) to the presentation system at the resume location. This notification will indicate that this system is the resume system for a particular presentation. In response to this notification, the resume system may present a message (such as "Resume Bookmarked Program?") that will allow the viewer to choose when to continue upon entering the new location.

Figure 6:
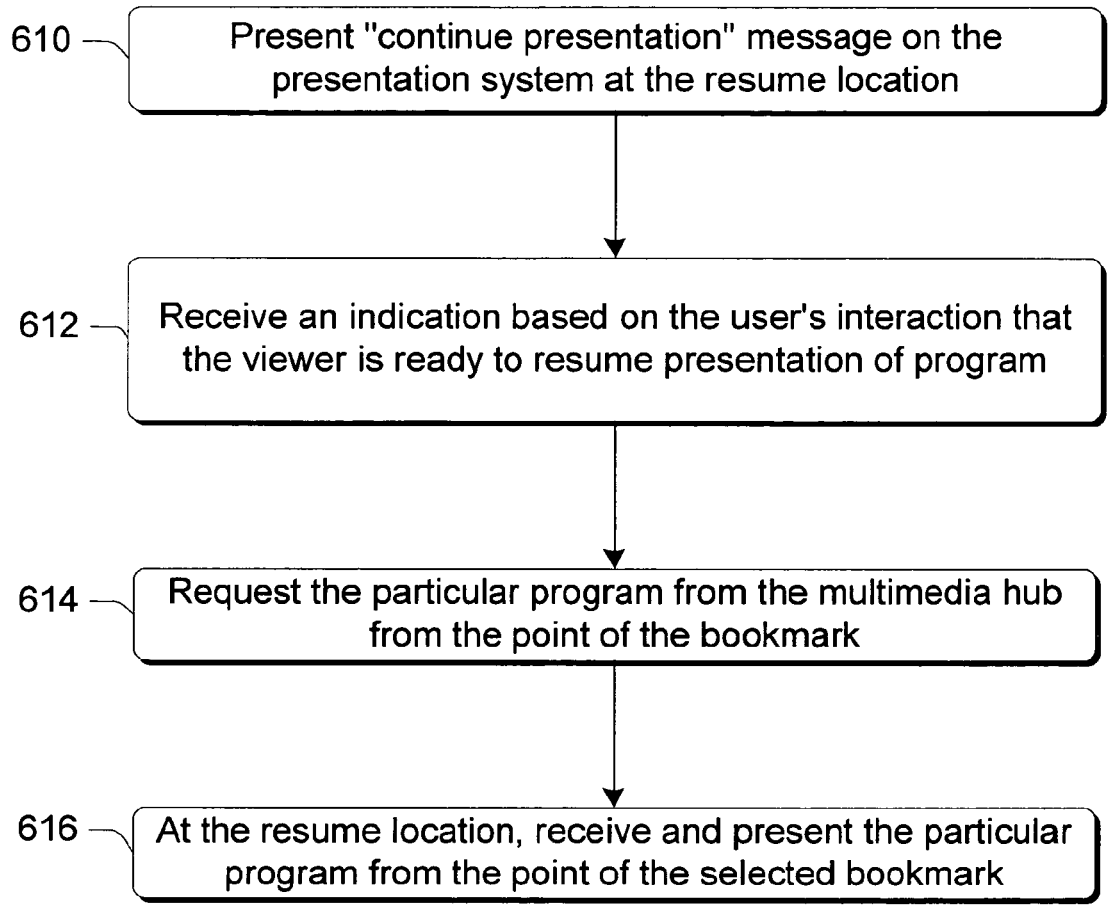
FIG. 6 is a flow diagram showing a methodological implementation described herein.

FIG. 6 shows a methodological implementation of the exemplary resumption architecture. This methodological implementation is focused on resuming a bookmarked presentation of multimedia content (stored or broadcast media) at another location. This methodological implementation may be performed in software, hardware, or a combination thereof.

At 610 of FIG. 6, in response to this notification (of block 518 of FIG. 5), a presentation system at the resume locus ("resume-locus system") presents a message (such as "Resume Bookmarked Program?") that will allow the viewer to choose when to continue viewing upon entering the new location. Of course, it may present any other equivalent message and/or GUI.

Furthermore, it may also present a graphical user interface (GUI). Examples of such GUIs are shown in FIGS. 7-13 and discussed in the corresponding text below.

At 612, the resume-locus system receives an indication based on the user's interaction that the user is ready to continue the bookmarked program.

At 614, it requests the bookmarked program from the multimedia hub from the point of the bookmark.

At 616, the resume-locus system receives from the hub the particular program from the point of the bookmark. It presents the program from that point.

Since this is the push-based model, the bookmark-locus system initiates the resumption of a bookmarked multimedia content rather than the resume-locus system.

Examples of Graphical User Interfaces

FIGS. 7-13 illustrate examples of GUIs that may be employed by the exemplary resumption architecture. Of course, other GUIs may be employed and variations of these exemplary GUIs may be employed. Unless otherwise stated, these GUIs are presented by the presentation system at the resume locus ("resume-locus system").

If desired, the exemplary resumption architecture may limit the display of bookmarks in the GUI. For example, it may only list bookmarks for programs that have been bookmarked during the last thirty minutes (or some other defined time interval).

Bookmarks Per Program

Figure 7:
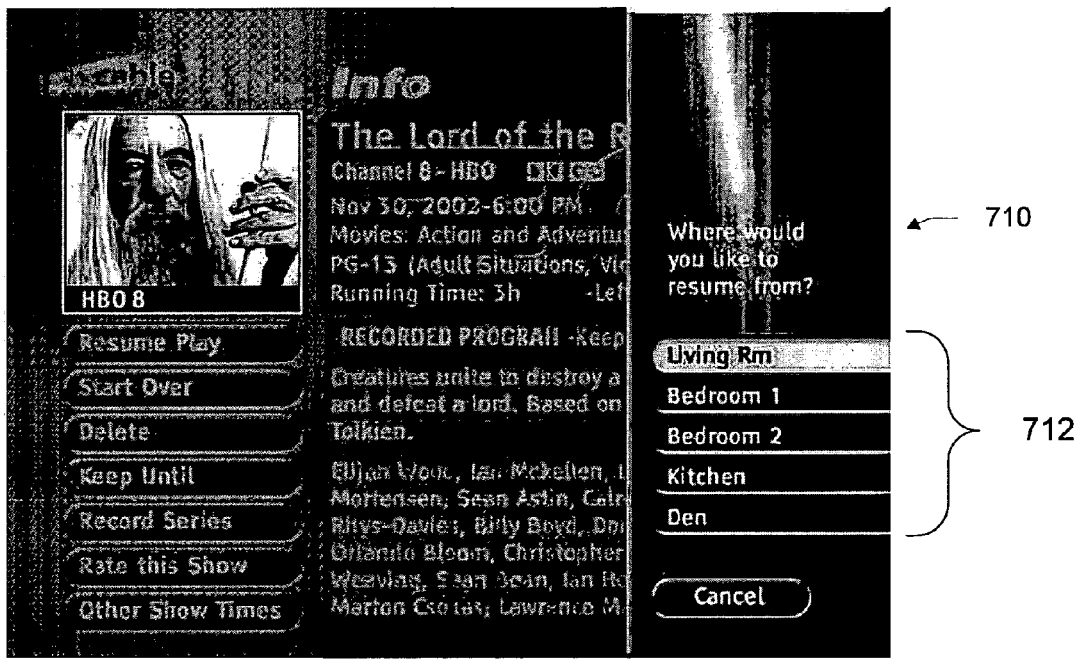
FIG. 7 illustrates an exemplary graphical user interface (GUI) that may be produced and/or used by at least one embodiment described herein.

FIG. 7 illustrates an example GUI that displays all of the current bookmarks for the same particular multimedia presentation. In this example, that presentation is the "Lord of the Rings." In this example, each different bookmark is identified by the location where the presentation was bookmarked. At 710, the GUI asks from where the user would like to resume. At 712, the GUI provides a list of the current locations where the "Lord of the Rings" was bookmarked. It lists "Living Rm," "Bedroom 1," "Bedroom2," "Kitchen," and "Den."

Alternatively, the GUI may list other properties of the bookmark. For example, it may be listed by the following properties:
  the relative time within the presentation that it was bookmarked;
  the absolute time (e.g., 8:34:43 pm) that it was bookmarked (as shown in FIG. 8);
  who bookmarked it;
  most recently bookmarked bookmarks, in order; and
  category of the programming.

It may provide a selectable option to choose which way to view the listed properties. Furthermore, it may list multiple properties of the bookmarks. For example, it may indicate who, at what time, at what location.

Most Recent Bookmarks Per Program

Figure 8:
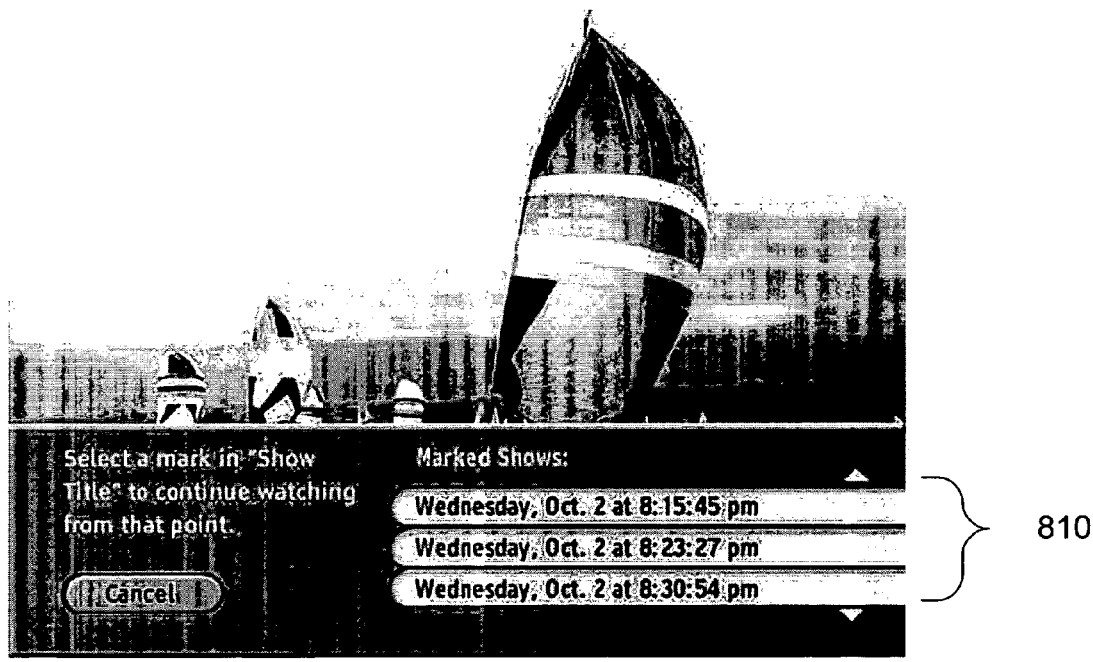
FIG. 8 illustrates an exemplary graphical user interface (GUI) that may be produced and/or used by at least one embodiment described herein.

FIG. 8 illustrates an example GUI that displays just the most recently bookmarked programs for the same particular multimedia presentation. The GUI provides a list of the most recently bookmarked programs 810. It provides an absolute timestamp with the listings.

Bookmarks GUI

Figure 9:
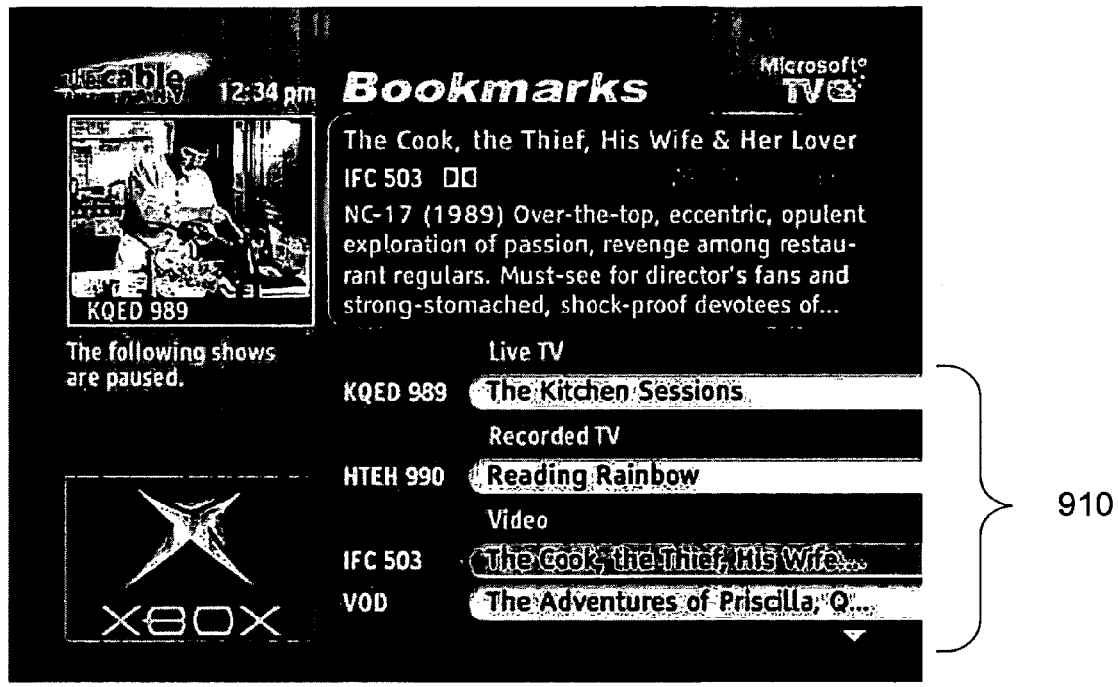
FIG. 9 illustrates an exemplary graphical user interface (GUI) that may be produced and/or used by at least one embodiment described herein.
Figure 10:
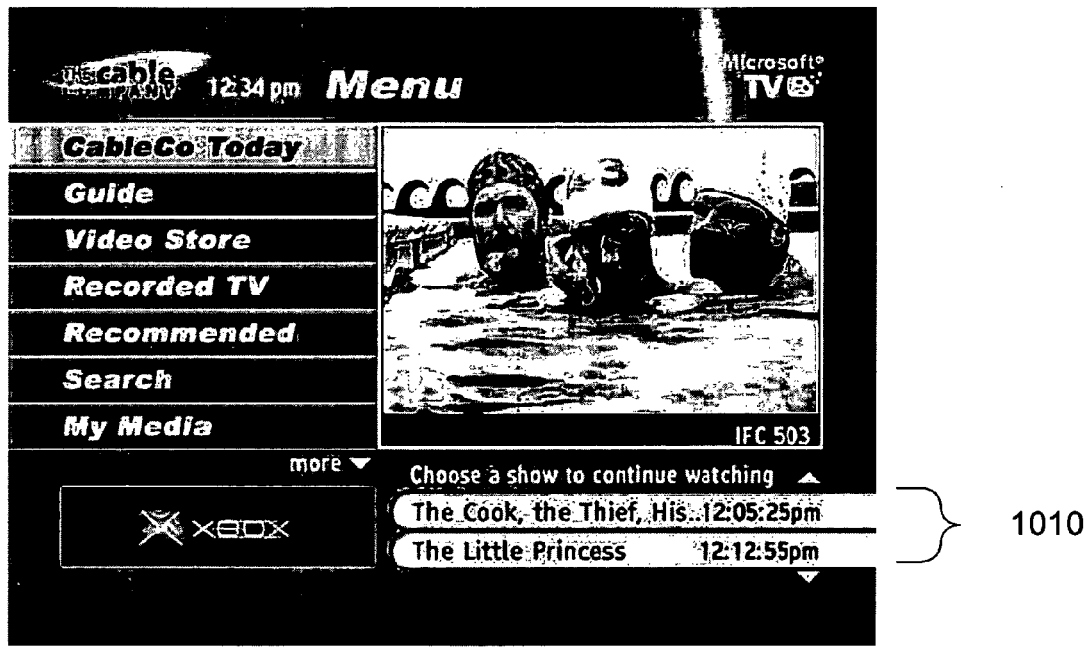
FIG. 10 illustrates an exemplary graphical user interface (GUI) that may be produced and/or used by at least one embodiment described herein.

FIGS. 9 and 10 illustrate example GUIs that display just the bookmarked programs. The GUI provides a list of the current programs that are bookmarked at 910 in FIGS. 9 and 1010 in FIG. 10.

In the example in FIG. 9, this screen of the GUI shows four programs that are bookmarked. Of course, there may be more that the user may scroll up or down to see (or use some other available browsing method).

Alternatively, the GUI may list a subset of all of the bookmarks. This subset is selected based upon one or more properties. For example, the GUI may list:
  identity of the multimedia content;
  relative point of bookmark during the presentation;
  most recently bookmarked multimedia programs;
  category of multimedia content bookmarked;
  locus of system where the presentation was bookmarked;
  identity of user who manually bookmarked the presentation;
  chronological time of the bookmark generating;
  chronological date of the bookmark generating; and
  relative time during the presentation where the presentation was bookmarked.

Broadcast Media

Figure 11:
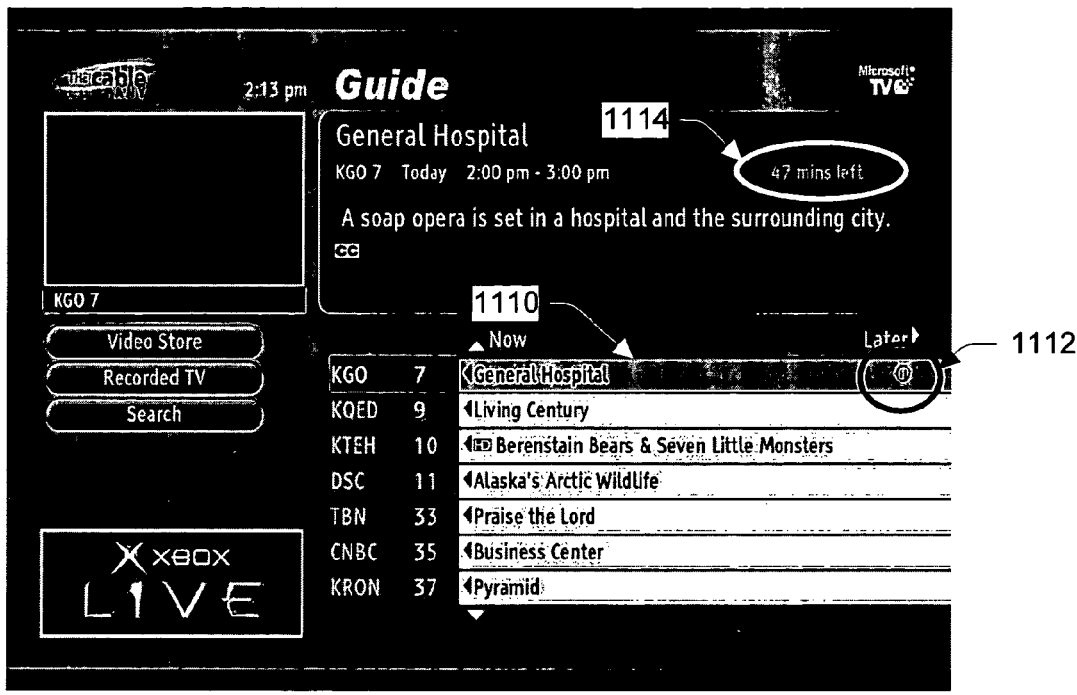
FIG. 11 illustrates an exemplary graphical user interface (GUI) that may be produced and/or used by at least one embodiment described herein.
Figure 12:
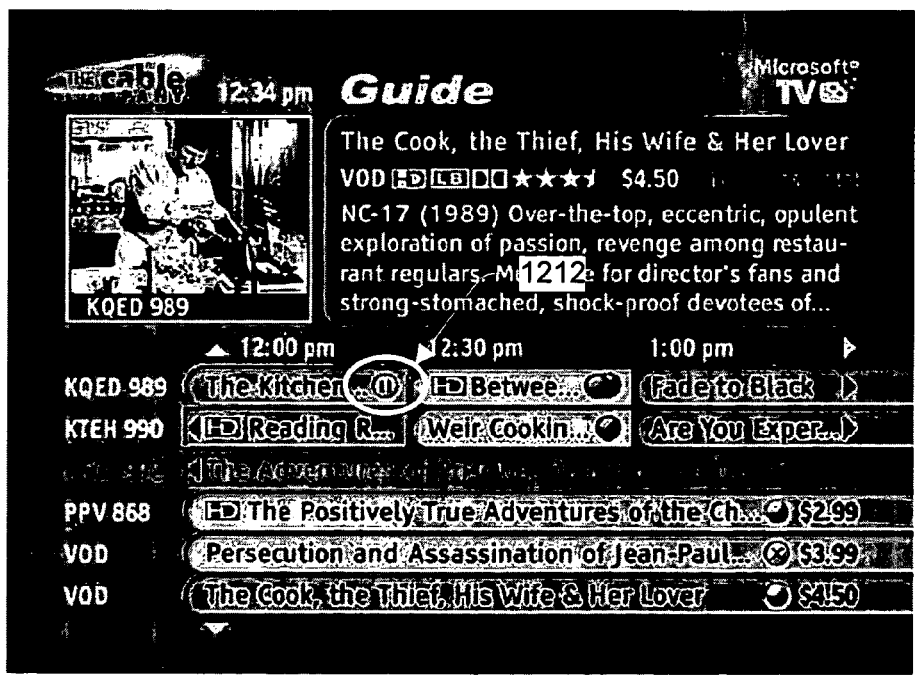
FIG. 12 illustrates an exemplary graphical user interface (GUI) that may be produced and/or used by at least one embodiment described herein.

FIGS. 11 and 12 illustrate examples of GUIs that display a grid of broadcast media programming. This may include broadcast television, VOD, PPV, cable television, satellite television, and the like.

Unlike a typical broadcast media grid, the GUI illustrated in FIGS. 11 and 12 show a "bookmark" icon for the broadcast media that is currently bookmarked. In this example, KGO (channel 7) is currently showing "General Hospital" at 1110. A portion of the grid includes a "bookmark" icon 1112. It is circled here to make it easier to find in this illustration. Furthermore, the description of the currently highlighted program may indicate at 1114, the amount of time left from the bookmarked location in the bookmarked broadcast media program. FIG. 12 shows "bookmark" icon 1212 in a multiple grid view.

Alternatively, rather than listing the bookmarked broadcast media programs along with non-bookmarked programs, a GUI may present only the bookmarked broadcast media programs. In this alternative, there is no need to present a "bookmark" icon because all of the displayed programming in this GUI is bookmarked.

Resume from . . .

The "resume from . . . " GUI may be a simple message (such as "Resume Bookmarked Program?") presented on the screen of the resume-locus system and have simple "OK" and "cancel" options. Alternatively, it may have an interface that is more graphic and interactive.

DVD Pause and Resume

The above functionality applies to multimedia presentations from a DVD disk. However, it does not need to use a tuner since the content comes from the DVD reader in the hub (or attached thereto).

The DVD content may continue to be presented at the location where it was bookmarked. So, a person who remains in the room may continue to watch the DVD. The person who left the room may choose to resume the presentation of the DVD in another room. Much like the broadcast media scenario described above, the hub will receive the stored content (which has just been recorded from the DVD) for the user to watch.

Alternatively, the exemplary resumption architecture may note the location on the DVD when the user pauses or bookmarks it. Then the user removes the DVD. At a later time, the user may reinsert the DVD into the same system or another one in the networked environment. The system identifies the DVD and provides a GUI with the option to resume playing the DVD at the point it was last bookmarked.

Exemplary Multimedia Server

Figure 13:
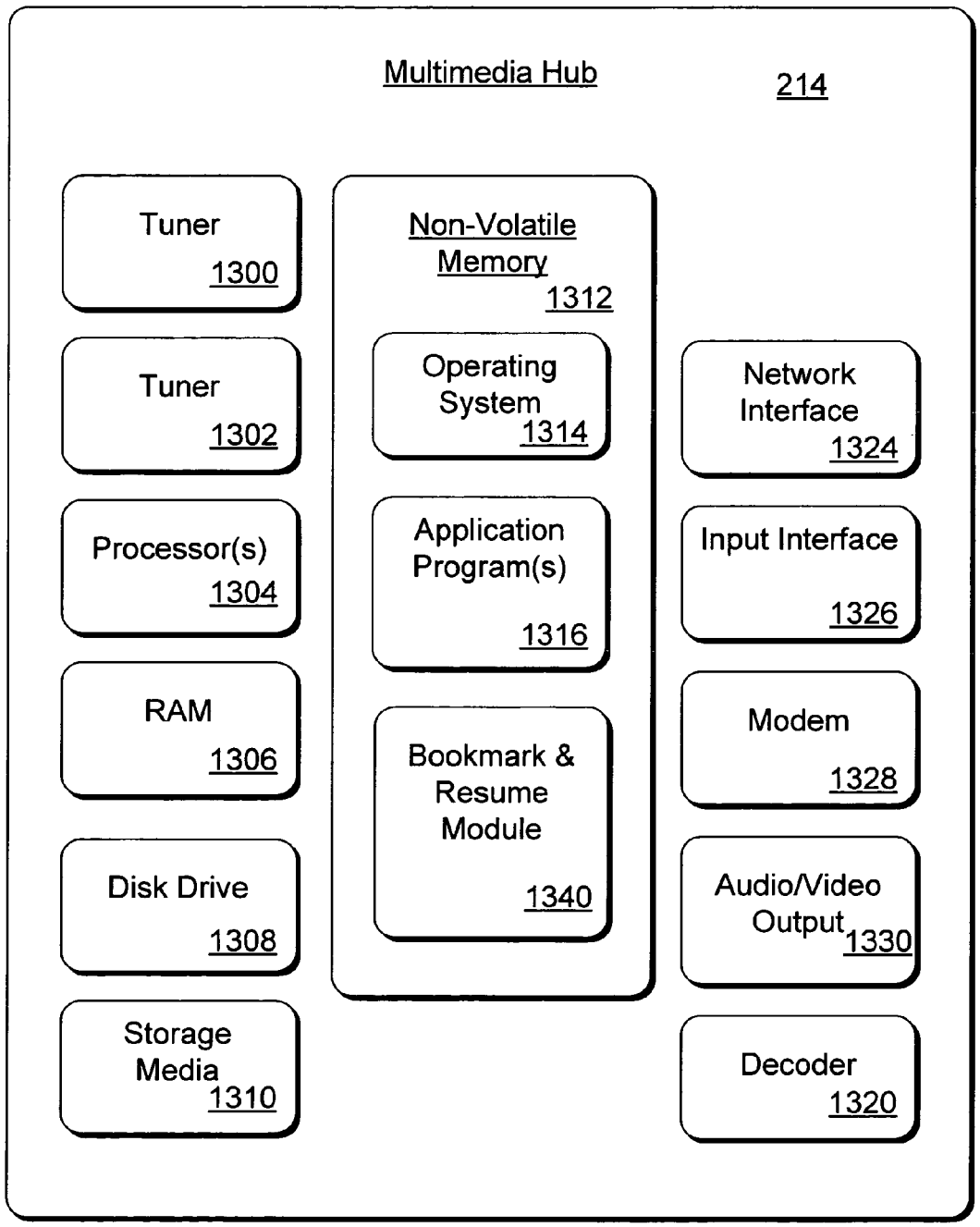
FIG. 13 is a block diagram that illustrates components of an example computing device of a multimedia hub of at least one embodiment described herein.

FIG. 13 illustrates an exemplary implementation of the multimedia server ("hub") 214. More particularly, it illustrates selected components of the system 220 shown in FIG. 2.

The system 220 includes a first tuner 1300 and one or more additional optional tuners 1302. The tuners 1300 and 1302 may be digital tuners, analog tuners, or any combination of analog and digital components used to get digital data into the system 220.

The hub also includes one or more processors 1304 and one or more memory components. Examples of possible memory components include a random access memory (RAM) 1306, a disk drive 1308, a mass storage component 1310, and a non-volatile memory 1312 (e.g., ROM, Flash, EPROM, EEPROM, etc.).

Alternative implementations of system 220 may include a range of processing and memory capabilities, and may include more or fewer types of memory components than those illustrated in FIG. 13.

Processor(s) 1304 process various instructions to control the operation of the system 220 and to communicate with other electronic and computing devices. The memory components (e.g., RAM 1306, disk drive 1308, storage media 1310, and non-volatile memory 1312) store various information and/or data such as multimedia content, electronic program data, web content data, configuration information for the hub, and/or graphical user interface information. The device may cache data into any one of these many memory components.

An operating system 1314 and one or more application programs 1316 may be stored in non-volatile memory 1312 and executed on processor 1304 to provide a runtime environment. A runtime environment facilitates extensibility of system 220 by allowing various interfaces to be defined that, in turn, allow application programs 1316 to interact with system 220.

The application programs 1316 that may be implemented on the hub may include, for example, an electronic program guide (EPG), an email program to facilitate electronic mail, and so on.

The system 220 may also include other components pertaining to a television entertainment system which, for simplicity, are not illustrated in this example. For instance, the hub can include a user interface application and user interface lights, buttons, controls, etc. to facilitate viewer interaction with the device.

Input interface 1326 (e.g., serial, parallel, infrared, etc.) and network interface 1324 allow the hub to interact and communicate with other electronic and computing devices via various communication links. Furthermore, the input interface 1326 may ultimately allow a user to provide input into the hub. Although not shown, the hub may also include other types of data communication interfaces to communicate with other devices.

The system 220 may include a modem 1328 or other communications device that facilitates communication with other electronic and computing devices via a conventional telephone line or other communications mediums.

The system 220 has the ability to receive digital data, and it may receive it using the tuners 1300 or 1302, the network interface 1324, the modem 1328, or other communications device.

The system 220 may also include an audio/video output 1330 that provides signals to a presentation device (e.g., television) or other device that processes and/or presents or otherwise renders the audio and video data. This output may be called the display.

The system 220 also includes a bookmark and resume module 1340 that partially or wholly implements the exemplary resumption architecture. It may be an application program or a hardware component.

Although shown separately, some of the components of the hub may be implemented in an application specific integrated circuit (ASIC). Additionally, a system bus (not shown) typically connects the various components within the hub.

A system bus may be implemented as one or more of any of several types of bus structures, including a memory bus or memory controller, a peripheral bus, an accelerated graphics port, or a local bus using any of a variety of bus architectures. By way of example, such architectures can include a Card-Bus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus, also known as a Mezzanine bus.

Exemplary Multimedia Presentation System

Figure 14:
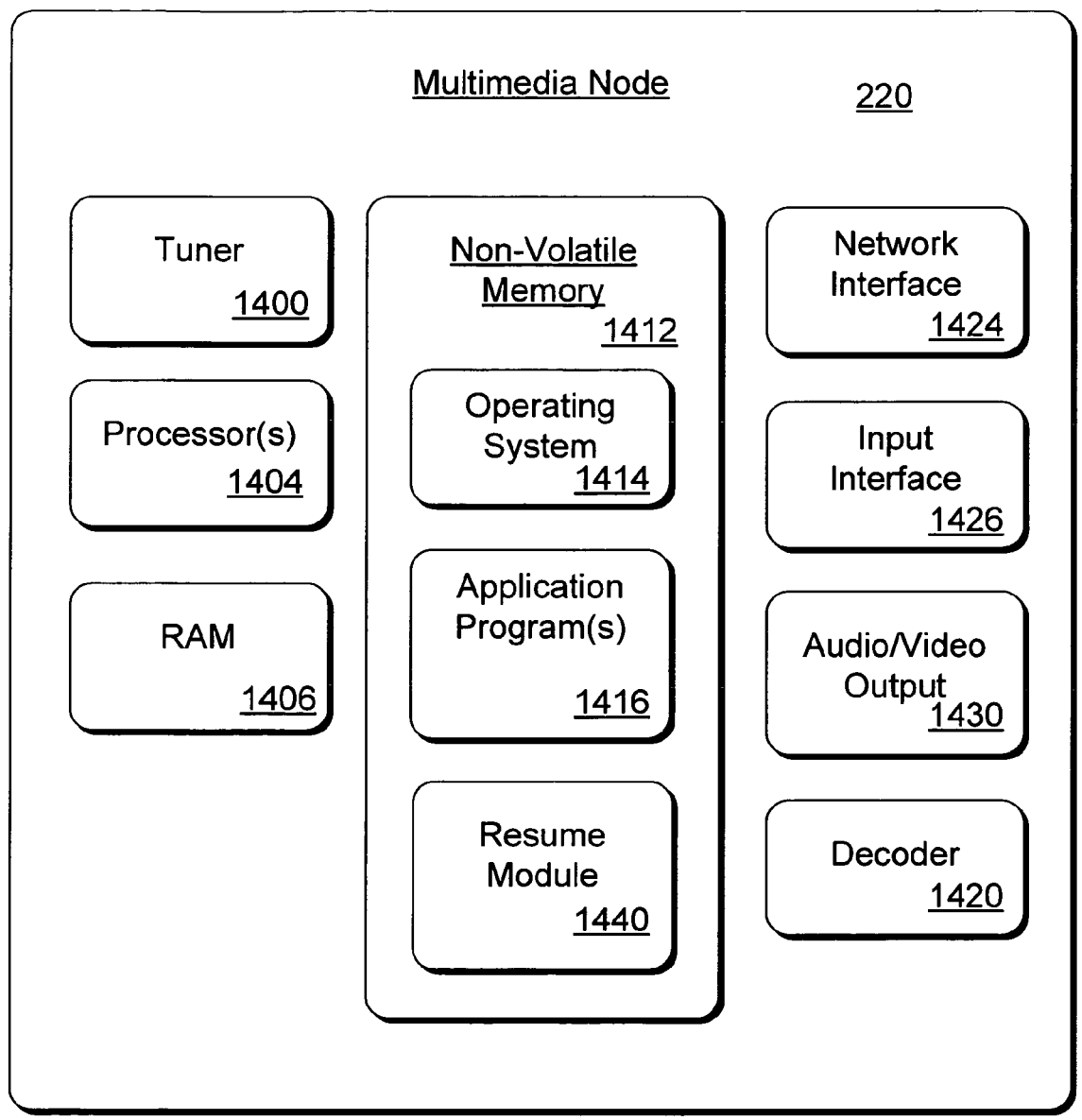
FIG. 14 is a block diagram that illustrates components of an example computing device of a presentation system of at least one embodiment described herein.

FIG. 14 illustrates an exemplary implementation of a node multimedia presentation system, such as system 220 of FIG. 2.

The system 220 includes a tuner 1400, one or more processors 1404 and one or more memory components. Examples of possible memory components include a random access memory (RAM) 1406 or other a non-volatile memory (e.g., ROM, Flash, EPROM, EEPROM, etc.).

Alternative implementations of system 220 may include a range of processing and memory capabilities and may include more or fewer types of memory components than those illustrated in FIG. 14.

Processor(s) 1404 process various instructions to control the operation of the system 220 and to communicate with other electronic and computing devices. The memory components store various information and/or data such as multimedia content, electronic program data, web content data, configuration information for the system, and/or graphical user interface information. The device may cache data into any one of these many memory components.

An operating system 1414 and one or more application programs 1416 may be stored in non-volatile memory and executed on processor 1404 to provide a runtime environment. A runtime environment facilitates extensibility of system 220 by allowing various interfaces to be defined that, in turn, allow application programs 1416 to interact with system 220.

Input interface 1426 (e.g., serial, parallel, infrared, etc.) and network interface 1424 allow the node to interact and communicate with other electronic and computing devices via various communication links. Furthermore, the input interface 1426 may ultimately allow a user to provide input into the node. Although not shown, the node may also include other types of data communication interfaces to communicate with other devices.

The system 220 may also include other components pertaining to a television entertainment system, which, for simplicity, are not illustrated in this example. For instance, the system can include a user interface application and user interface lights, buttons, controls, etc. to facilitate viewer interaction with the device.

The system 220 may also include an audio/video output 1430 that provides signals to a presentation device (e.g., television) or other device that processes and/or presents or otherwise renders the audio and video data. This output may also be called a multimedia rendering unit.

The system 220 also includes a resume module 1440 that partially or wholly implements the exemplary resumption architecture. It may be an application program or a hardware component.

Although shown separately, some components of the system may be implemented in an application specific integrated circuit (ASIC). Additionally, a system bus (not shown) typically connects the various components within system.

The node may also have a system bus may be implemented as one or more of any of several types of bus structures like those described above for the hub.

Processor-Executable Instructions

An implementation of an exemplary resumption architecture may be described in the general context of processor-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Processor-Readable Media

An implementation of an exemplary resumption architecture may be stored on or transmitted across some form of processor-readable media. Processor-readable media may be any available media that may be accessed by a computer. By way of example, and not limitation, processor-readable media may comprise "computer storage media" and "communications media."

"Computer storage media" include volatile and non-volatile, removable and non-removable media implemented in any method or technology for storage of information such as processor-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium, which may be used to store the desired information and which may be accessed by a computer.

"Communication media" typically embodies processor-readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example and not limitation, communication media includes wired media such as a wired network or direct-wired connection, and wireless media such as acoustic, RF, infrared, and other wireless media. Combinations of any of the above are also included within the scope of processor-readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer storage media excluding a signal or carrier wave without physical structure, the computer storage media storing processor-executable instructions that, when executed by a processor, configures a computer to perform operations comprising:
   presenting a first user interface (UI) on a first multimedia presentation system at a first locus, the first UI providing a listing of multiple loci within a physical environment to which a bookmark can be sent;
   receiving, through the first UI, a user request to send a bookmark to a specified second locus from among any of the multiple loci, the second locus including a second multimedia presentation system, the bookmark including an indication of a point within a multimedia program, wherein the specified second locus need not be the same second locus in the event of a subsequent user request;
   sending the bookmark to the second multimedia presentation system at the second locus;
   in response to the second multimedia presentation system receiving the bookmark, and without user interaction, presenting a second UI on the second multimedia presentation system, the second UI prompting for user-selection to resume the multimedia program at the second multimedia presentation system;
   in response to presenting the second UI, receiving a user selection through the second UI;
   requesting that a communicatively coupled multimedia server stream to the second multimedia presentation system, the multimedia program, beginning from the point within the multimedia program indicated by the bookmark; and
   presenting the multimedia program at the second multimedia presentation system from the point within the multimedia program indicated by the bookmark.

2. One or more computer storage media as recited in claim 1, wherein the first UI includes a listing of bookmarks associated with a particular multimedia program, and the user request to send a bookmark includes a bookmark selected from the listing of bookmarks associated with the particular multimedia program.

3. One or more computer storage media as recited in claim 1, wherein the first UI includes a listing of bookmarks associated with a particular multimedia program based upon one or more properties associated with the bookmarks.

4. One or more computer storage media as recited in claim 1, wherein the second UI includes a listing of one or more bookmarks associated with a particular multimedia program based upon one or more properties associated with the bookmarks, the one or more properties being selected from a group consisting of:
   identity of the particular multimedia program;
   relative point of the bookmark during the presentation of the particular multimedia program;
   a category of the particular multimedia program;
   a locus of a system where the particular multimedia program was bookmarked;

identity of a user who manually bookmarked the particular multimedia program;
chronological time of generation of the bookmark;
chronological date of generation of the bookmark.

5. One or more computer storage media as recited in claim 1, wherein the second UI graphically illustrates at least one of the following:
   a category of the multimedia program;
   a locus of a system where the multimedia program was bookmarked;
   chronological time when the multimedia program was bookmarked;
   chronological date when the multimedia program was bookmarked; or
   relative time when the multimedia program was bookmarked.

6. One or more computer storage media as recited in claim 1, wherein the second UI includes a listing of broadcast media programs that have one or more bookmarks and were bookmarked within a selected time.

7. One or more computer storage media as recited in claim 1, wherein the second UI includes a listing of broadcast media programs available with indicators corresponding with broadcast media programs that have one or more bookmarks.

8. One or more computer storage media as recited in claim 1, wherein the second UI includes a grid listing of broadcast media programs available with indicators corresponding with broadcast media programs that have one or more bookmarks.

9. One or more computer storage media as recited in claim 1, wherein the second UI includes a listing of broadcast media programs available with indicators corresponding with broadcast media programs that have one or more bookmarks, wherein the appearances of the indicators vary to indicate differences in one or more properties associated with bookmarked broadcast media programs.

10. A computing device comprising:
    a multimedia presentation unit;
    one or more computer storage media as recited in claim 1.

11. A system comprising: means for receiving, at a first multimedia system at a first location, a bookmark indicating a position within a multimedia program, the bookmark having been set from a user interface providing a listing of multiple locations with physical environment to which a bookmark can be sent from a second multimedia system at a second location;
    means for presenting a UI on the first multimedia presentation system, the UI including a display of the bookmark and a prompt for user input to accept the bookmark and resume presentation of the multimedia program at the first multimedia presentation system, the UI being presented in direct response to receiving the bookmark, the UI not being presented in response to user interaction with the first multimedia presentation system;
    means for receiving user input through the UI that indicates a user request to resume presentation of the multimedia program from the position of the bookmark;
    means for requesting that a communicatively coupled multimedia server stream to the first multimedia presentation system, the multimedia program from the position of the bookmark; and
    means for presenting the multimedia program at the first multimedia presentation system from the position of the bookmark.

12. A computer storage medium excluding a signal or carrier wave without physical structure, the computer storage medium having computer-executable instructions recorded thereon that, when executed by a processor, instructs the processor to perform operations comprising:
    generating a bookmark to mark a point during a presentation of a program, the program being presented through a first presentation system at a first physical location within a physical environment;
    storing the bookmark that marks the point during presentation of the program; receiving, through a user interface at the first presentation system, a selection of a second presentation system at a second physical location within the physical environment, the selection indicating that the bookmark is to be sent to the second presentation system; and
    in response to the selection of the second presentation system through the user interface at the first presentation system, sending the bookmark to the second presentation system, causing the second presentation system to present, without user interaction, a user interface indicating the ability to resume, through the second presentation system, presentation of the program from the point marked by the bookmark.

13. A computer storage medium as recited in claim 12, the operations further comprising storing multiple bookmarks for the program, wherein each bookmark has one or more properties associated therewith.

14. A computer storage medium as recited in claim 12, the operations further comprising determining whether an action performed by a user is one which is designated to generate a bookmark and, if so, generating and storing the bookmark.

15. A computer storage medium as recited in claim 14, wherein the action performed by the user comprises an action selected from a group of actions consisting of:
    selecting another source of multimedia content;
    viewing a list of other sources of multimedia content;
    manually pressing a "bookmark" key; and
    manually pressing another pre-defined key or choosing a pre-defined option.

16. A computer storage medium as recited in claim 12, wherein properties associated with the bookmark are selected from a group of properties consisting of:
    chronological time when the bookmark was generated; and
    chronological date when the bookmark was generated.

17. A computer storage medium as recited in claim 12, the operations further comprising receiving the multimedia program as part of a broadcast media transmission.

18. A computer storage medium as recited in claim 12, the operations further comprising receiving the multimedia program as part of a broadcast media transmission, wherein the broadcast media transmission is one of incoming live television broadcast, incoming live cable television signal, incoming live satellite signal, incoming live video-on-demand signal, or incoming live pay-per-view signal.

19. A computer storage medium as recited in claim 12, the operations further comprising sending the bookmark to each of a plurality of second presentation systems within the physical environment, enabling resumption of the program at the point of the bookmark from any of the plurality of second presentation systems within the physical environment.

20. A computer storage medium as recited in claim 12, the operations further comprising presenting, through the user interface at the first presentation system, a listing of presentation systems within the physical environment to which the bookmark may be sent.

21. A computing device within the physical environment, communicatively coupled to the first presentation system and the second presentation system, the computing device comprising:

a digital video recorder (DVR) unit;
a computer storage medium as recited in claim 12.

22. A computing device as recited in claim 21, wherein the physical environment is a single building.

23. A computing device as recited in claim 21, wherein the physical environment is a plurality of neighboring buildings.

24. A method comprising:
receiving a program from a media distribution system;
streaming the program to a first presentation system at a first location over a local area network;
presenting a first user interface (UI) through the first presentation system, the first UI enabling a user to bookmark a point in a program, and the first UI indicating a list of other presentation systems to which a bookmark can be sent;
receiving, from the first presentation system, an indication of a point in a program;
generating a bookmark representing the point in the program that is indicated;
receiving, through the first UI and over the local area network, a user selection of a second presentation system from the list of other presentation systems;
sending the bookmark to the second presentation system over the local area network; and
presenting a second UI on the second presentation system, without user input on the second presentation system, wherein the second UI comprises an invitation for user input to accept the bookmark and resume the program at the second presentation system.

25. A method as recited in claim 24, wherein receiving the program from the media distribution system comprises receiving the program as part of a broadcast media transmission.

26. A method as recited in claim 25, wherein the broadcast media transmission comprises at least one of an incoming live television broadcast, an incoming live cable television signal, an incoming live satellite signal, an incoming live video-on-demand signal, or an incoming live pay-per-view signal.

27. A computer storage medium excluding a signal or carrier wave without physical structure, the computer storage medium having processor-executable instructions recorded thereon that, when executed by a processor, cause the processor to perform operations comprising:
receiving a multimedia program from a media distribution system as part of a broadcast media transmission wherein the broadcast media transmission is selected from a group consisting of incoming live television broadcast, incoming live cable television signal, incoming live satellite signal, incoming live video-on-demand signal, and incoming live pay-per-view signal;
communicating over a local area network with a first multimedia presentation system at a first physical location to present the multimedia program through the first multimedia presentation system;
communicating over the local area network with the first multimedia presentation system to present a first user interface (UI) on the first multimedia presentation system, wherein the first UI provides a listing of other multimedia presentation systems available on the local area network, the other multimedia presentation systems including a second multimedia presentation system at a second physical location;
determining that a user-submitted input is one which is designated to generate a bookmark;
in response to the determining, generating a bookmark that indicates a point during presentation of the multimedia program through the first multimedia presentation system;
sending the bookmark over the local area network to the second multimedia presentation system;
communicating over the local area network with the second multimedia presentation system to present a second UI on the second multimedia presentation system, wherein the UI on the second multimedia system includes at least one of:
a list of programs that have been bookmarked during a defined time; or an invitation to accept the bookmark and resume the multimedia program at the second multimedia presentation system, wherein the second UI is presented on the second multimedia presentation system independent of receiving user input.

28. A multimedia node communicatively coupled to a multimedia hub over a communications network, the multimedia node comprising:
a multimedia rendering unit configured to present multimedia content and one or more user interfaces (UIs) on a presentation device at a first locus; and a computing unit configured to:
receive a media content bookmark from the multimedia hub, the media content bookmark being received in response to a user-submitted request at another multimedia node at a second locus, to create the media content bookmark and to specify to send the media content bookmark to the multimedia node at the first locus;
upon receipt of the media content bookmark, and without user input, present a UI on the presentation device at the first locus, wherein the UI presented on the presentation device at the first locus includes an indication that the media content bookmark is available; and
upon user-selection of the indication that the media content bookmark is available, presenting, on the presentation device at the first locus, media content associated with the media content bookmark, beginning at a location within the media content that is indicated by the media content bookmark.

29. A multimedia node as recited in claim 28, the media content being streamed to the multimedia node from the multimedia hub.

30. A multimedia node as recited in claim 28, further comprising a user-interface control panel configured to receive a user-input action that triggers generation of a multimedia bookmark, such action is selected from a group consisting of:
selection of another source of multimedia content;
viewing a list of other sources of multimedia content;
manually pressing a bookmark key; and
manually pressing another pre-defined key or choosing a pre-defined option.

31. A multimedia node system as recited in claim 28, wherein indication that the media content bookmark is available includes properties associated with the media content bookmark, the properties being selected from a group consisting of:
a category of the media content that was bookmarked;
a locus of a system where the media content bookmark was requested;
chronological time of the bookmark generating;
chronological date of the bookmark generating;
relative time during the presentation of the media content when the presentation was bookmarked; and
graphical depiction of relative time when the presentation of the media content was bookmarked.

32. A multimedia node as recited in claim 28, wherein the multimedia hub receives the media content as part of a broadcast media transmission.

33. A multimedia node as recited in claim 32, wherein the broadcast media transmission is selected from a group consisting of incoming live television broadcast, incoming live cable television signal, incoming live satellite signal, incoming live video-on-demand signal, and incoming live pay-per-view signal.

34. A multimedia presentation system comprising:
a server device having a first tuner and a second tuner, the first tuner operable to receive a first multimedia program, and the second tuner operable to receive a second multimedia program;
a first presentation system coupled to the first tuner over a local area network, the first presentation system being configured to receive and present the first multimedia program, and wherein the first presentation system is configured to generate a bookmark indicating a location within the first multimedia program; and
a second presentation system coupled to the second tuner over the local area network, the second presentation system being configured to receive and present the second multimedia program;
wherein:
the server device is configured to store the bookmark in association with the first multimedia program;
a user interface (UI) on the first presentation system is configured to prompt for user input indicating a presentation system available on the local area network to which the bookmark generated at the first presentation system is to be sent;
a UI at the second presentation system, the presentation system to which the bookmark is sent, is configured to prepare, for selection by a user, an indication that the user has arrived at the second presentation system and is ready to resume the first multimedia program as indicated by the bookmark, the indication being prepared and displayed for selection in direct response to receiving the bookmark and independent of any user interaction with the second presentation system; and
the server device is further configured to allow the second presentation system to access the first multimedia program beginning at the location within the first multimedia program that is indicated by the bookmark.

35. The multimedia presentation system as recited in claim 34, wherein:
the first and second presentation systems are the presentation systems at which the bookmark was generated and to which the bookmark was sent, respectively;
the bookmark is identified, at the second presentation system, in part by reference to the first presentation system at which the bookmark was generated; and
the server device is configured to swap the first and second tuners in response to the bookmark, such that the first presentation system is coupled to the second tuner over the local area network and the second presentation system is coupled to the first tuner over the local area network.

36. The multimedia presentation system as recited in claim 34, wherein:
the user interface (UI) on the first presentation system comprises a plurality of keys, each key associated with a location to which a bookmark can be sent; and
the UI at the second presentation system comprises a plurality of keys, each key associated with a bookmark received at the second presentation system and each key labeled with a time the bookmark was made.

37. The multimedia presentation system as recited in claim 34, wherein the user interface (UI) on the first presentation system comprises a plurality of keys, each key associated with rooms in a home that contain presentation systems.

38. A multimedia presentation system as recited in claim 34, wherein the UI on the first presentation system is additionally configured to send the bookmark generated at the first presentation system to a plurality of presentation systems upon which the first multimedia program can be resumed.

39. A multimedia server system, the multimedia server system being configured to be communicatively coupled to a plurality of multimedia presentation systems, the server system comprising:
a plurality of multimedia-content receivers configured to receive multimedia programs, a first receiver of the one or more multimedia-content receivers associated with a first multimedia presentation system of the multimedia presentation systems, and a second receiver of the one or more multimedia-content receiver associated with a second multimedia presentation system of the plurality of multimedia presentation systems;
one or more storage units configured to store the multimedia programs;
a computing unit configured to:
bookmark a point during a presentation of a multimedia program of the multimedia programs on the first multimedia presentation system to generate a bookmark;
associate one or more properties with the bookmark;
store the bookmark in association with the multimedia program;
perform at least one of:
swap the first receiver with the second receiver if the bookmark is accessed on the second multimedia presentation system, to associate the first receiver with the second multimedia presentation system and to associate the second receiver with the first multimedia presentation system; or
share the first receiver if the bookmark is accessed on the second multimedia presentation system, to present on the first multimedia presentation system the multimedia program from the first receiver, and to present on the second multimedia presentation system the multimedia program from the first receiver;
wherein a user interface (UI) associated with the first multimedia presentation system is configured to prompt for a location to which to send a bookmark generated at the first multimedia presentation system, and wherein a UI at a second multimedia presentation system, to which the bookmark was sent, is configured, responsive to the location to which the bookmark was sent including the second multimedia presentation system, to prepare and display, independent of user input, for selection by a user, an indication that a program has arrived at the second multimedia presentation system and is ready to resume presentation as indicated by the bookmark.

40. A server system as recited in claim 39 further comprising a user-interface control panel configured to receive user input action that triggers generation of the bookmark, such action is selected from a group consisting of:
selection of another source of multimedia content;
viewing a list of other sources of multimedia content;
manually pressing "bookmark" key; and
manually pressing another pre-defined key, or choosing a pre-defined option.

41. A server system as recited in claim 39, wherein the properties associated with the bookmark are selected from a group consisting of:
 locus of system where the presentation was bookmarked;
 chronological time of the bookmark generating; and
 chronological date of the bookmark generating.

42. A server system as recited in claim 39, wherein:
 the first and second receivers are the receivers at which the bookmark was generated and to which the bookmark was sent, respectively;
 the bookmark is identified, at the second presentation system, in part by reference to the first multimedia presentation system at which the bookmark was generated;
 the multimedia server system is configured to swap the first and second multimedia content receivers, resulting in the second multimedia presentation system being associated with a first tuner, a first buffer, and first recorded content previously associated with the first multimedia presentation system, and the first multimedia presentation system being associated with a second tuner, a second buffer, and second recorded content previously associated with the second multimedia presentation system; and
 the multimedia server system is configured to share the first multimedia-content receiver, resulting in both the first and second multimedia presentation systems being associated with the first tuner, the first buffer, and the first recorded content.

43. A server system as recited in claim 39, wherein the one or more multimedia-content receivers are further configured to receive the multimedia program as part of a broadcast media transmission, wherein the broadcast media transmission is selected from a group consisting of incoming live television broadcast, incoming live cable television signal, incoming live satellite signal, incoming live video-on-demand signal, and incoming live pay-per-view signal.

44. A multimedia system comprising: a multimedia server comprising a first tuner and a second tuner, the first tuner operable to receive a first multimedia program, and the second tuner operable to receive a second multimedia program;
 a first presentation system coupled to the multimedia server and associated with the first tuner, the first presentation system operable to receive and present the first multimedia program and a user interface (UI) to receive a user-submitted request to bookmark a location within the first multimedia program and to provide a listing of other multimedia presentation systems for selection from which the first multimedia program can be resumed from the bookmark location; and
 a second presentation system coupled to the multimedia server and associated with the second tuner, the second presentation system operable to receive and present the second multimedia program;
 wherein the multimedia server is configured to:
 receive from the first presentation system, the user-submitted request to bookmark the location within the first multimedia program;
 in response to the user-submitted request, store the bookmark in association with the first multimedia program and, without receiving a request from the second presentation system, for a predefined time send an indication of the bookmark to the second presentation system for presentation of the bookmark at the second presentation system; and
 resume presentation of the first multimedia program at the second presentation system;
 receive a user submitted request to resume the presentation of the first multimedia program at the second presentation system; and resume presentation of the first multimedia program at the second presentation system.

45. A multimedia system as recited in claim 44, wherein:
 the bookmark is identified, at the second presentation system, in part by reference to the first presentation system at which the bookmark was generated; and
 the multimedia server swaps receivers for the first and second presentation systems, resulting in the first tuner, a first buffer, and a first recorded content previously associated with the first presentation system being associated with the second presentation system and the second tuner, a second buffer, and a second recorded content previously associated with the second presentation system being associated with the first presentation system if the bookmark, requested through the first presentation system, is accessed by a user of the second presentation system.

46. A multimedia system as recited in claim 44, wherein the multimedia server shares the first tuner with both the first and the second multimedia presentation systems.

47. A multimedia system as recited in claim 44, further comprising a user-interface control panel configured to receive user input action that triggers generation of the bookmark, such action is selected from a group consisting of:
 selection of another source of multimedia content;
 viewing a list of other sources of multimedia content;
 manually pressing "bookmark" key; and
 manually pressing another pre-defined key, or choosing a pre-defined option.

48. A multimedia system as recited in claim 44, wherein the multimedia server is further operable to:
 associate one or more properties with the bookmark; and
 store the bookmark in association with the first multimedia program;
 wherein the properties associated with the bookmark are selected from a group consisting of:
 a locus of system where the presentation was bookmarked;
 a chronological time of the bookmark generating; and
 a chronological date of the bookmark generating.

49. A multimedia system as recited in claim 44, wherein in response to the user-submitted request, presenting, through the second presentation system, a user interface indicating that the first multimedia program is available.

50. A multimedia system as recited in claim 44, wherein the user-submitted request to bookmark a location within the first multimedia program sends an indication of the bookmark to each of a plurality of second presentation systems.

* * * * *